United States Patent [19]
Doonan

[11] Patent Number: 6,114,401
[45] Date of Patent: Sep. 5, 2000

[54] PLASTIC RECLAMATION PROCESS

[76] Inventor: Billie Odell Doonan, Rte. 2, Box 114-D, N. Pt. Pleasant Rd., Gladewater, Tex. 75647

[21] Appl. No.: 08/215,462

[22] Filed: Mar. 21, 1994

[51] Int. Cl.⁷ .............................. C08J 11/04; B02C 19/14
[52] U.S. Cl. ................... 521/40; 521/42.5; 521/43.5; 521/44; 521/46; 521/46.5; 521/48; 521/48.5; 264/37.1; 264/39; 264/69; 241/20
[58] Field of Search ................ 521/40, 42.5, 43.5, 521/44, 46, 46.5, 48, 48.5; 264/37, 39, 69; 241/20, DIG. 38

[56] References Cited

U.S. PATENT DOCUMENTS

| | | | |
|---|---|---|---|
| 3,652,466 | 3/1972 | Hittel et al. | 521/40.5 |
| 4,033,907 | 7/1977 | Wolf | 521/40.5 |
| 5,120,768 | 6/1992 | Sisson | 521/46.5 |
| 5,248,041 | 9/1993 | Deiringer et al. | 521/46.5 |
| 5,340,839 | 8/1994 | Gillette et al. | 521/40 |
| 5,375,778 | 12/1994 | Lundquist | 241/24 |

FOREIGN PATENT DOCUMENTS

| | | | |
|---|---|---|---|
| 3511711 | 2/1986 | Germany | 521/40 |

*Primary Examiner*—James J. Seidleck
*Assistant Examiner*—Olga Asinovsky
*Attorney, Agent, or Firm*—Robert Nisbett

[57] ABSTRACT

A plastic article or plastic container reclamation process if provided in which plastic containers are divided into relatively large pieces, then washed, agitated and separated using an aqueous solvent to remove residual materials. The residual materials such as motor oil are reclaimed for reuse and the aqueous solvent is regenerated for reuse in the process. Residual materials such as dirt, labels and adhesives from the plastic containers is recovered for recycling or passed to waste for disposal or reuse.

20 Claims, 1 Drawing Sheet

PLASTIC RECLAMATION PROCESS

BACKGROUND AND PRIOR ART

This invention relates to a process for removing residual material from plastic containers such as those used for motor oils, detergents and other liquid products. The plastic containers are cleaned so that the plastic can be recycled for making new plastic products. The residual material such as motor oil is reclaimed and can also be recycled.

Numerous reclamation processed have been developed for specific types of plastics containers used for different materials. Previous processes require reduction of the plastic containers to small particles which requires heavy duty grinding equipment that can handle the residue and trash often associated with reclaimed plastic containers and which results in excessive wear on the grinders and other process equipment from both the small plastic particles and from the residual trash which often includes sand, dirt and other abrasive material. The small plastic particles themselves are typically abrasive and are frequently processed by attrition, by using high energy centrifugal equipment and frequently using powerful and toxic hydrocarbon or organic based solvents. Each of these requirements results in an expensive process in terms of complex equipment costs, operating costs, material costs and excessive wear on the equipment. Typical processes are described in the following patents:

U.S. Pat. No. 4,606,774 to Morris describes a process for removing contaminates from soil by washing the soil with a counter-current stream of a hydrocarbon solvent as the soil passes through an incline screw. Solvent entrained in the soil is removed by a hot air stream in a fluidized bed scrubber and the recovered solvent is purified by a distillation process.

U.S. Pat. No. 4,906,302 to Bruya describes a process for removing organic hazardous waste from soil using an aqueous ammonia solvent. The soil is removed, crushed, screened, agitated with the ammonia solvent and separated from the solvent in settling tanks. The solvent is then purified by a centrifuge, then extraction and distillation.

U.S. Pat. No. 4,956,033 to Martin et. al. describes a process for reclaiming plastic containers by sorting the containers by capacity of the bottle and type of plastic, then removing caps and retaining rings. Each bottle is then expanded by injecting heated liquid internally, then washing the container with a high pressure spray and finally grinding the container. Water can be the liquid used for expansion and washing. The expansion step removes labels and adhesive from the bottle.

U.S. Pat. No. 5,084,135 to Brooks et. al. describes a process for recovering cellulose fiber from partially processed cardboard having some plastic coating material associated with it by repulping the cellulose and plastic material in an aqueous bath in which the plastic tends to float and the cellulose tends to sink. The cellulose and plastic are dried and recycled.

U.S. Pat. No. 5,160,441 to Lundquist describes a process for separating motor oil from granulated plastic particles using a continuous fed auger-centrifuge. The residual oil is recovered in concentrated form although an optional solvent wash is also described.

U.S. Pat. No. 5,185,041 to Anderson et. al. describes a process for washing plastic granules using a rotating drum housing containing a wash solvent header and a rinse header to wash and rinse the plastic granules in sequence. The washed granules are spin dried for recycling.

U.S. Pat. No. 5,215,596 to Slyke describes a process for washing drill cuttings from a mine or oil well drilling operation which uses an oil-based drilling mud in which the cuttings are treated with a high carbon carboxylic acid then washed with an aqueous, alkaline solution.

U.S. Pat. No. 5,217,628 to Lundquist describes a process for centrifugally separating motor oil from granulated plastic particles using a high centrifugal energy batch type apparatus without any solvent.

U.S. Pat. No. 5,232,607 to Lundquist describes a process for granulating plastic containers then separating motor oil from the plastic granules using a high centrifugal energy batch type apparatus without any solvent.

U.S. Pat. No. 5,236,603 to Sampson describes a process for reclaiming plastic from mild jugs by granulating the plastic containers the using a cold water wash step to remove bacterial and residual milk products then separating the plastic granules according to specific gravity using one or a series of aqueous solvent baths each having a different specific gravity.

U.S. Pat. No. 5,255,859 to Peacock et. al. describes a process for separating plastic flakes from foreign matter by first classifying the plastic flakes and other material the washing and digesting the plastic flakes or granules in a recirculating tank for a sufficient time to separate the plastic flakes and foreign matter. The plastic flakes are then screened and dried for recycling.

BRIEF SUMMARY OF INVENTION

The process of this invention provides a simple reclamation process which does not require that the plastic containers be cleaned or ground into small flakes or granules prior to entering this process. The process of this invention does not require complex or elaborate process equipment to classify and handle small plastic particles. It does not require special handling of the plastic containers to expand the containers with water or other fluid to wash or loosen the labels and adhesive on the plastic containers. The process of this invention does not require a hydrocarbon solvent or complex separation equipment.

One embodiment this invention provides a process for recycling or reclaiming plastic containers by dividing the containers into relatively large size particles such as in a range of from about one-half to five inches. The containers can still have the caps on them and be processed according to this invention if the caps are of the same or a compatible type of plastic. The containers can have some residual materials such as trash including dirt, labels, adhesives, motor oil and such like in or attached to the container and be cleaned and sized for recycling by the process of this invention. The process of this invention produces very little toxic waste by-product since most of the processing fluids are recycled within the process.

One embodiment this invention provides a process for recycling plastic containers containing residual materials comprising the steps of: (a) dividing said containers into pieces of a size in the range of about one-half to five inches; (b) placing said sized container pieces in a washer with an aqueous based solvent adapted to loosen said residual material; (c) agitating said sized container pieces in said aqueous solvent; (d) separating said sized container pieces from said aqueous solvent and said residual material; (e) separating said aqueous solvent from said residual material and recirculating said aqueous solvent to said wash step; (f) recovering useable residual material; and (g) passing said recyclable sized plastic container pieces to a recycle process.

Several optional features and steps can be used with each embodiment of this invention as will be apparent from this description to those skilled in the art.

DETAILED DESCRIPTION OF INVENTION

Figure 1:
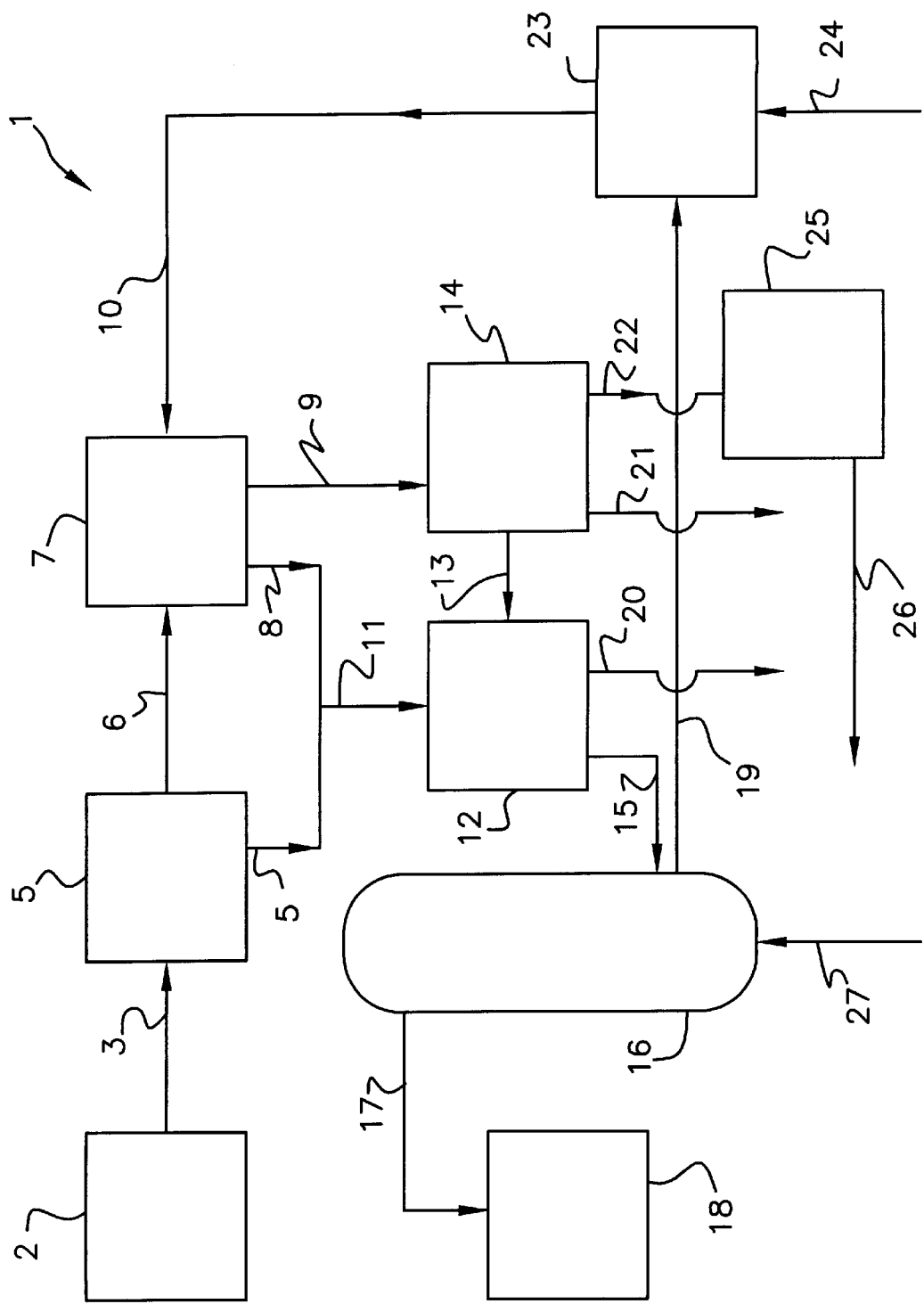
FIG. 1 shows a schematic diagram for one embodiment of the process of this invention.

In one of the broadest embodiments of the process of this invention the process for recycling or reclaiming plastic articles such as containers containing residual materials for recycling the plastic and residual materials comprises the steps of dividing or cutting the said articles or containers into pieces of a size in the range of about one-half to five inches; placing said sized parts or pieces in a vessel or washer for contacting said parts with an aqueous based solvent adapted to loosen said residual material; agitating said sized parts in said vessel with said aqueous solvent; separating said sized parts from said aqueous solvent and residual material; separating said aqueous solvent form said residual material and recirculating said aqueous solvent to said contacting step; recovering useable residual material; and passing said recyclable plastic parts to a recycle process.

The process of this invention can be used to reclaim for recycling or reuse various types of plastic objects. Generally thermoplastic materials are most widely used and recycled. These plastics include polyethylenic polymers and copolymers such as polyethylene, polypropylene, polybutadiene and such like. However, other polymers and copolymers such as acrylates, acrylonitriles, vinyl halides, terephthalates, styrenes, polycarbonates, and even elastomeric polymers such as ethylenic-diene polymers, sulfonic polymers, butadiene polymers and polymers having substituents such as halides, silicone, oxygen, nitrogen and sulfur groups can be reclaimed by one or more of the processes of this invention.

A broad embodiment the process of this invention includes the step of dividing the plastic article such as plastic containers into relatively large pieces of a size in the range of about one-half inch to five inches. The overall size and shape of the original plastic article determines the optimum size of the divided pieces. One main consideration is that pieces should be small enough to allow the aqueous solvent to reach each area of the plastic pieces and yet the pieces should be large enough to allow ease in handling and loading into the various vessels used for the process steps. For plastic containers which may contain residual materials, each container should be divided into enough parts or in such a way as to allow any residual liquid to drain out of the pieces and to allow the aqueous solvent to freely flow into and around all of the spaces of the container pieces. If the containers are of suitable size and shape they could be divided into just two parts for processing. For some containers it may be necessary to divide them into many pieces. By dividing the plastic articles into large pieces for removing residual materials less energy and work are required both for dividing the articles and for the washing and cleaning phases of the process.

The dividing process can be accomplished in several ways. One of the simplest is to have the plastic articles or containers cut by knife or saw into two or more parts suitable for the contacting step. This can be done manually or by automatic knives or saws through which the plastic containers or articles are fed again either manually or by automatic conveying equipment. The plastic containers will typically be stored in some type of bin or vessel before the articles are divided and after they have been sized by cutting or dividing. Optionally, the storage binds can be provided with drainage means such as taps and lines to catch any liquid residual material and convey it to a residual material storage bin or vessel. Since the articles or containers are divided into optimum size for containing with aqueous solvent, it is not essential that plastic caps be removed from the containers. The caps can be reclaimed and recycled by the process of this invention attached to the plastic container or article.

After the plastic articles or containers are sized for contacting, the plastic pieces are loaded into a vessel or washer for contacting and agitating with an aqueous solvent. The vessel should be one that will contain a sufficient amount of plastic parts and aqueous solvent for an economic process. A suitable vessel would be a generally cylindrical vessel having a diameter in the range of about 24 to 58 inches and a length in the range of about 30 to 90 inches. The generally cylindrical shape includes vessels having a polygon cross section which symmetrical or balanced about a vertical axis so that the contents of the vessel can be agitated by rotating or reciprocating the vessel about that vertical axis. The vessel should be equipped with drain means for removing liquid from the vessel and should be capable of being rotated rapidly about the vertical axis to centrifugally remove most of the aqueous solvent from the vessel and any plastic parts inside. For efficient removal of liquid and residual material the vessel should rotate at speeds sufficient to generate gravitational forces up to about 300 g. or 300 times the normal force of gravity. For ease in removing plastic parts after contacting with aqueous solvent the vessel should have a means for unloading solids from within the vessel such as a tilting vessel or an ejection pan or baffle located in the bottom of the vessel.

One type of vessel in which the contacting, agitating and separating of various components can be done is an industrial type washer-extractor model Cascadex L-tron that can handle up to about 450 pounds of plastic and aqueous solvent. This model of contactor is made by American Laundry Machinery, Inc. of Cincinnati, Ohio. Other types of contractors can be used and separate vessels can be used for different phases of the process; however, this type of contactor can be used to perform several of the process steps at once or in sequence. The L-tron extractor can be used to contact a large load of plastic pieces with aqueous solvent by simply filling the machine with divided plastic pieces and aqueous solvent which can be allowed to stand for the time desired or which can be agitated by reciprocating motion about a central axis of an inner basket or vessel. The inner basket of the L-tron is perforated and has flow control devices for the aqueous solvent to provide maximum agitation and cleaning action which helps loosen and remove residual materials such as motor oil, dirt, labels, adhesive, and other debris from the plastic pieces in a short time. The aqueous solvent is adapted to help remove and suspend the residual materials so that these materials will be removed from the plastic pieces with the aqueous solvent. The perforated inner basket of the contactor facilitates separation of the plastic pieces from the aqueous solvent because the two phases can be easily separated by simply draining the liquid aqueous solvent phase containing the residual material from contact vessel leaving the solid plastic pieces in the inner basket. The L-tron is equipped for further separation of the liquid from the solid pars by centrifugal action. The L-tron inner basket can be rotated at high speed to provide a centrifugal force up to about 300 times the normal force of gravity. This extra separation force simply speeds up the process of this invention and reduces the time and space to complete the separation of aqueous liquid and solid plastic particles.

Following the separation of liquid and solid particles, the divided plastic pieces are easily removed from the L-tron since the vessel is adapted to tilt and dump the solid contents of the inner basket. The plastic pieces are dumped either on to a conveyor system leading to a separator or onto the separator directly from the contacting vessel. If a conveyor system is used due to size and/or location of the conveyor should be provided with liquid recovery means to catch any aqueous liquid and residual materials that may drip from the plastic pieces during transit. All of the aqueous liquid and residual materials should be returned to the solvent separation and recycling steps. The liquid and solid particles separation step can be performed by the contacting and agitating vessel or it can be performed by a separate apparatus such as a screen separator. Other type of separators such a specific gravity floatation separators, liquid cyclone type separators, or leaf type liquid-solid separators can be used. However, one or more screen type separators can be used to separate a liquid phase, and one or more solid phases in one operation. For example, a screen separator such as those made by the Brandt Company for separating the components of drilling mud having two or more screens can be used to separate the liquid aqueous phase containing residual materials from solid plastic particles. The same screen separator can then separate the very fine solids suspended in the liquid aqueous phase from that aqueous liquid so that the fine solids can be transferred to a solids waste or reclamation system. The aqueous liquid solvent can be transferred to a solvent reclamation system where any dissolved or remaining suspended ultra-fine solids or suspended liquids such as residual motor oil, detergent or other liquid by-product can be removed and reclaimed.

The aqueous liquid solvent phase is separated from the solid plastic particles in one or more separation steps depending upon the types of residual materials that may be present and the time and type of separation actions necessary. In one embodiment an optional separation step includes the use of a settlement separator or vessel between the screen separator and the liquid solvent reclamation process steps. This liquid separator can be of a simple settlement tank design which allows fine solid particles to separate from the liquid phase. The fine solids must be removed from the liquid solvent at a rate to provide a relatively constant concentration of fines remaining in regenerated solvent to avoid excess build-up of fines in the washing and contacting steps. Excess fines in the aqueous solvent at these stages can reduce the cleaning efficiency of the aqueous solvent. Fines removed from the liquid solvent can be removed, and neutralized, if necessary. The fines can be dried, then used as filler for fertilizers or soils because they will consist mainly of silica residue, paper residue, adhesive residue and maybe traces of other non-toxic organic materials. The liquid separator can be used to allow separation from the aqueous solvent of some of the organic liquid residual material such as motor oil which may be emulsified in the aqueous phase. It can also be used to allow any foam or froth formed by residual materials such as soaps or detergents to separate from the aqueous liquid solvent before it is regenerated and recycled to the washing steps with new batches of plastic particles. The liquid separation step can also be conducted in other types of vessels such a cyclonic separators, upflow clarifiers, baffled tanks, leaf filters, membrane separators and combinations of these type of separation vessels. The precise combination of separation apparatus and vessels for the liquid separator step will depend upon the amount and particular types of residual material associated with the plastic articles being reclaimed and handled by the process. For example, large quantities of foaming detergents may require larger and more elaborate liquid separation apparatus than a process which handles plastic containers that just have residual motor oil. The presence of plastic containers with other types of solvents such as oxygenated hydrocarbons may require additional separation means. To minimize the liquid separation problems at the liquid solvent reclamation steps additional drainage time and steps of the plastic articles and containers can be provided at the raw material storage phase and following the dividing or cutting of the plastic articles into the large pieces that are loaded into the contacting vessel. In other words, removing more of the residual material from the plastic containers or articles before contacting with the aqueous solvent can reduce the time and equipment required to separate and reclaim the liquid solvent later. From the liquid separation step additional fine residual solids are passes to a solids waste or reclamation process. In addition, some residual liquids such as motor oil or detergent may be passed to a motor oil reclamation process and storage or to a waste disposal system.

From the screen separator and/or liquid separation steps the aqueous liquid solvent phase is passed to a liquid solvent regeneration or liquid phase separator. This step can be conducted with several types of equipment such as heat-treaters, chemical type emulsion breaker vessels, membrane type liquid separators and combinations thereof. However, the heat-treater type of equipment is simple and has been used for some time by industries such as for oil and gas production. The heat-treater or liquid separation vessel can be a relatively simple cylindrical vessel into which the liquids to be separated are passed. The liquids are heated either before going into the vessel or in the vessel or both. Typically the separation vessel has a series of baffles which promote breaking of any emulsion along with the heat and maybe added chemicals. The baffles also promote separation of the various liquid phases according to specific gravity of the different liquid phases. Usually, an organic phase is lighter and floats upward and an aqueous phase is heavier and settles toward the bottom of the vessel. In this way an organic phase such as motor oil or a hydrocarbon based detergent is removed from the top of the liquid separator and regenerated aqueous solvent is removed from the bottom of the liquid separator. One type of heat-treater that can be used is a model ICP treater such as made by the National Tank Company. A generally cylindrical vessel having a diameter in the range of about 3 feet to 10 feet can be used depending upon the flow rates of the various liquid streams and baffle arrangement desired. The vessel can have a height in the range of about 10 feet to 50 feet again depending upon the flow rates of the various streams and the residence time desired for the separation process. If heat is used for the emulsion breaking and separation action, it can be supplied by steam either indirectly or directly injected into the liquid phases in the vessel. Heat can also be supplied by electric heating elements, by hydrocarbon fired heating elements or by combinations of these. In addition, solar heating can be used but generally will require some supplemental heat source. For most commercial separation and reclamation processes, a heat-treater vessel capable of handling from about 300 to 6,000 barrels of aqueous liquid a day would be preferred. One preferred embodiment would be sized to handle about 500 to 5,000 barrels a day using 55 gallon barrels. For the reclamation and separation process of this invention, the liquid separation step is sized to handle the aqueous solvent phase used; however, exceptionally large amounts of liquid residual materials carried by the aqueous solvent may require larger or additional liquid separation steps and equipment. From the liquid separation step a reclaimed organic phase such a motor oil is passes to a clean oil storage vessel which then goes to a motor oil reprocessing system. From the liquid separation step the regenerated aqueous solvent passes to an aqueous solvent storage vessel to which make-up chemicals or agents are added and from which the aqueous solvent is taken for the contacting and washing steps described above.

The aqueous solvent used for the contacting and washing steps of this invention is an alkaline water solvent phase. It can contain one or more types of other solvents or cleaning agents such as substituted hydrocarbons that facilitate removal and suspension of adhesives typically used with plastic articles and containers. Such other solvents include: oxygenated hydrocarbons, such as ethers, alcohols, surfactants, ketones, aldehydes, cyclic hydrocarbons, and aromatic hydrocarbons and combinations thereof. The solvents should have the specific activity desired and limited solubility in the organic phase such as motor oil. Specific examples of materials which an be used include one or more of the following: furfural, phenol, nitrobenzene, liquid propane, chlorex, aniline, nitroethane, methanol, isopropyl propane, ethyl acetate, ammonium acetate, glycol, amyl acetate, cyclohexanone, chloroform, liquid ammonia, furfural-naphtha, xylene, hydrocarbons, chlorinated hydrocarbons, acetone, isobutanol-tetra-chloroethane, methyl-isobutyl-ketone, n-butanol, butylene glycol, butylene glycol diacetate, methylvinyl carbinol acetate, isoamyl ether, ethanol, cyclohexane, hexane, nitrobenzene, di-n-propyl ketone, tert-butanol, ethylene diamine, sodium hydroxide, ethyl ether, triethyl amine, acetaldehyde, isoamyl acetate, toluene, glycerin, aniline, styrene, methyl isobutyl ketone, methyl ethyl ketone, gasoline, triethylamine, propionic acid, cyclohexane, cottonseed oil, bromotoluene, carbon tetrachloride, tetrachloroethylene, potassium hydroxide, potassium nitrate, ammonium nitrate, ammonium hydroxide, halide silicate, halogenated hydrocarbons, oxygenated hydrocarbons, and hydrocarbons having other substituents such as nitrogen, sulphur, silicon, phosphorus and combinations thereof. One preferred embodiment uses one or more of the oxygenated hydrocarbon ethers with an alkaline halide and a halide silicate and a glycol or a glycol derivative. For example, one or more of 2-butoxyethanol, monobutyl ether, 2-amino ethanol, ethylene glycol monobutyl ether, amyl acetate, methyl isobutyl ketone, ethylene glycol, butylene glycol, amylether, methyl ethyl ether, triethyl amine, ethyl acetate are preferred for one embodiment. Such aqueous solvent would be alkaline having a pH in the range of about 8 to 12.5 and preferably in the range of about 9 to 12 by the addition of one or more of the alkaline metal halides or alkaline metal oxides or hydroxides such as sodium or potassium hydroxide. Ammomium hydroxide can also be used. The aqueous solvent should also contain a small amount of one or more surfactants, preferably of a low sudsing or low foaming type such as a nonionic surfactant. For treatment of plastic having a large amount of dirt associated therewith some anionic surfactant may be desired to improve suspension of this type of residual material. The aqueous solvent should be used in the contacting and washing steps heated to a temperature in the range of about 90 to 130 degrees Fahrenheit and more preferably in the range of about 100 to 120 degrees. The temperature may also be limited by the substituted hydrocarbon solvent or solvents used in the water or aqueous phase. More volatile solvents can create high pressure at higher temperatures and the working pressure of the contacting, washing and liquid recovery steps should be in the range of about 10 to 100 psi (pounds per inch gauge) and preferably in the range of about 25 to 50 psig. Higher pressure increases the cleaning effectiveness of the aqueous solvent but also requires higher pressure ratings for the equipment and increases safety requirements for the various higher pressure steps.

As an example of one embodiment of the process of this invention for cleaning high density polyethylene and polypropylene which are typically used to contain more oil, one quart plastic containers are cut in half using a band saw. The container parts are cut over a table equipped with a drain pan which catches any residual motor oil and conveys it to a drain basin. The cut containers are stored in a vessel which also catches any residual motor oil and conveys it to the drain basin. Generally, about 3 gallons of oil is recovered per 100 pounds of plastic at this stage.

The cut plastic containers are placed into an American L-tron washer. The washer is filled with aqueous solvent containing de-greasing solvent composed of butoxyethanol, ethylene glycol, a nonionic surfactant and caustic soda. About 5% or less of caustic soda is used. The aqueous solvent is maintained at a pH in the range of about 11.5 to 12. About one to 5 ounces of de-greaser solvent is used per each 10 gallons of aqueous solvent. The aqueous solvent is used at a temperature in the range of about 90 to 120 and preferably about 100 to 110 degrees Fahrenheit for the contacting and washing steps. The plastic particles are agitated in the washer with the aqueous solvent for a period of about 5 to 30 minutes and preferably about 10 to 20 minutes. The aqueous solvent is drained from the washer and passed through a vibrating screen separator to remove any retained plastic particles and to separate the liquid phase from the plastic and any fine solids. The fine solids are passed to a waste solids reclamation or disposal system. The liquid solvent is passed to a liquid separation unit to reclaim any organic phase and to regenerate the aqueous liquid solvent.

Plastic particles remaining in the washer are further dried or separated from any remaining liquid phase by spinning the inner basket of the L-tron washer at a speed sufficient to create a centrifugal force of up to about 300 times the normal force of gravity. The contacting with heated aqueous solvent, agitating and spin drying are sufficient to remove practically all of the residual material associated with the plastic containers. Dried plastic container parts are dumped into the vibrator screen separator to further remove any remaining liquid and fine solids.

The plastic container parts pass from the screen separator to a grinder where they are reduced to the desired size for storage, packaging and return to a plastic recycling process. The grinder generally reduces the plastic container parts to a size in the range of about 0.01 to 0.5 inch and preferably in the range of about 0.1 to 0.25 inches. The grinder can easily reduce the plastic parts to the desired size since the plastic is free of residual materials such as dirt, oil, labels and adhesives. The ground plastic particles can be stored in bulk or packaged as desired for use or shipment.

The liquid solvent is passed to a heater-treater liquid separator for recovery of any organic phase such a motor oil and for regeneration of the aqueous solvent for reuse in the washing and agitation steps. Before the liquid phase passes into the heater-treater it is passed through another separation vessel where any fine solids are allowed to settle out of the aqueous liquid. These fine solids are passed to the fine solids reclamation system or to waste disposal. The liquid solvent is passed into a National Tank Company model ICP heat-treater designed to handle 500 to 5,000 barrels of water a day at about 50 psi where the solvent is heated using natural gas fired indirect heating coils. An organic motor oil phase is recovered from the top of the treater and passed to the motor oil storage vessel. A regenerated aqueous solvent phase is recovered from near the bottom of the treater and passed to the aqueous solvent storage vessel for reuse in the washing and agitation steps.

One embodiment of the process of this invention is shown in FIG. 1 in schematic form. FIG. 1 shows the process generally by numeral 1. At number 2 a raw material storage bin or vessel is shown. This vessel is used to store plastic containers or plastic article which are to be processed and reclaimed for recycling. Number 3 shows the plastic containers or articles passing to a cutting table with a saw or knife at 4 where the containers or articles are divided into smaller parts and the containers are opened so that they will drain and so that solvent can contact all areas of the plastic articles. At number 5 a drain for recovered residual liquid such as motor oil is shown. In FIG. 1, the recovered motor oil at 5 and 8 is shown going through the liquid separator 12, the liquid solvent regenerator 16 to the organic phase storage vessel 18. The recovered motor oil at 5 and 8 can be passed directly to the storage vessel 18 rather than through the liquid separation vessel 12 and liquid solvent regeneration vessel 16. Whether the recovered motor oil is passed through the liquid separation vessel 12 and regeneration vessel 16 will depend upon the amount of residual trash or dirt and paper that needs to be removed from the motor oil. Relatively clean oil can be passed directly to the storage vessel 18 while dirty oil should be cleaned using the steps shown at 12 or 16 or some other cleaning steps. Number 6 shows the plastic parts and other solids passing to washer 7 where aqueous solvent is added by line 10. The plastic parts are washed, agitated and drained in washer 7 then passed to separator 14 as shown at 9. Recovered motor oil from drain lines 5 and 8 is shown combining at 11 and going into liquid separator 12. The cleaned plastic parts pass from the washer 7 by line 9 to a screen separator 14 where the plastic parts are separated from the liquid phase which passes by line 13 to the liquid separator 12. Fine solid waste is removed from the screen separator at 21 and from the liquid separator at 20. The fine solid waste materials go to recycling or disposal systems which are not shown. Liquid solvent to be regenerated passes from liquid separator 12 by line 15 to a regeneration unit 16 such as a heat-treater. In the regenerator 16 an organic phase such as motor oil is separated from the aqueous phase and passes out of the regenerator near the top of the unit at 17 to an organic phase or motor oil storage vessel 18. The aqueous solvent is regenerated by the application of heat in the regeneration vessel 16 as shown at 27. A regenerated aqueous solvent phase passes out of the vessel 16 near the bottom by line 19 to aqueous solvent storage vessel 23. To the regenerated aqueous solvent in storage vessel 23, additional chemicals or additional aqueous solvent is added by line 24. The cleaned and dried plastic parts pass from separator 14 by line 22 to a grinder 25 where the cleaned and dried plastic parts are reduced to the size desired for storage, packaging and shipping or reuse. The sized plastic particles pass from grinder 25 to storage or recycling by line 26.

What is claimed is:

1. A process for reclaiming and preparing plastic containers for recycling said plastic which plastic containers have residual material such as an organic liquid phase and a solid waste associated therewith comprising the steps of:
    a) cutting said containers into relatively large plastic pieces that are small enough to allow aqueous solvent to reach each area of said pieces,
    b) placing said cut plastic pieces into a washer with an aqueous based solvent adapted to loosen and suspend said residual materials,
    c) agitating said aqueous solvent by rotating or reciprocating said washer or a part thereof to loosen, suspend and remove said residual material,
    d) separating said aqueous solvent containing suspended residual material from said plastic pieces by simply draining said aqueous solvent from said plastic pieces,
    e) separating said aqueous solvent from an organic liquid residual material and from a solid waste residual material,
    f) regenerating said aqueous solvent and recycling said aqueous solvent in the process,
    g) recovering a useable organic liquid residual material free of solid waste residual material and free of aqueous solvent,
    h) recovering a solid waste residual material free of organic liquid residual material and free of aqueous solvent, and
    i) passing cleaned plastic pieces to a plastic recycle process free of organic liquid residual material, solid waste residual material and aqueous solvent.

2. A process of claim 1 for reclaiming and preparing plastic containers for recycling which containers have a residual material such as an organic liquid phase and a solid waste associated therewith wherein said plastic containers are divided into plastic pieces of a size in the range of about one-half to five inches.

3. A process of claim 1 for reclaiming and preparing plastic containers for recycling which containers have a residual material such as an organic liquid phase and a solid waste associated therewith wherein the plastic containers are divided into pieces small enough to allow the aqueous solvent to reach each area of the plastic pieces and the plastic pieces are large enough to allow ease in handling and loading into the washer.

4. A process of claim 1 for reclaiming and preparing plastic containers for recycling which containers have a residual material such as a liquid organic phase and a solid waste associated therewith wherein the washer is a generally cylindrical vessel having a diameter in the range of about 24 to 58 inches and a length in the range of about 30 to 90 inches and which washer is adapted to be agitated by rotating or reciprocating the washer or a part thereof and wherein said aqueous solvent containing any suspended liquid organic phase and solid waste is separated from said plastic pieces by centrifugal forces.

5. A process of claim 1 for reclaiming and preparing plastic containers for recycling which containers have a residual material such as a liquid organic phase and a solid waste associated therewith wherein the aqueous solvent contains at least one material selected from the group comprising an alkaline metal halide, an alkaline metal oxide, an alkaline metal hydroxide or combinations thereof and said aqueous solvent has a pH in the range of about 8 to 12.5.

6. A process of claim 1 for reclaiming and preparing plastic containers for recycling which containers have a residual material such as a liquid organic phase and a solid waste associated therewith wherein said aqueous solvent contains a small amount of at least one low foaming surfactant to improve suspension of residual material in said aqueous solvent.

7. A process of claim 1 for reclaiming and preparing plastic containers for recycling which containers have a residual material such as a liquid organic phase and a solid waste phase associated therewith wherein a centrifugal separator is used to separate said aqueous solvent containing suspended therein any liquid organic phase and any solid waste wherein said centrifugal separator is capable of generating centrifugal forces up to about 300 times the normal force of gravity.

8. A process of claim 1 for reclaiming and preparing plastic containers for recycling which containers have a residual material such as a liquid organic phase and a solid waste phase associated therewith wherein said aqueous solvent containing any liquid organic phase and any solid phase is separated into the aqueous phase and an organic phase by applying heat to break the suspension of said residual materials in said aqueous phase and wherein said liquid organic phase comprises an oil and said solid waste phase comprises silica residue, paper residue, adhesive residue, other organic materials or combinations thereof.

9. A process of claim 1 for reclaiming and preparing plastic containers for recycling which containers have a residual material such as a liquid organic phase and a solid waste phase associated therewith wherein said aqueous solvent contains at least one agent that facilitates removal and suspension selected from the group comprising hydrocarbons having substituents selected from halogen, oxygen, nitrogen, sulfur, silicon, phosphorus and combinations thereof.

10. A process of claim 1 for reclaiming and preparing plastic containers for recycling which containers have a residual material such as a liquid organic phase and a solid waste phase associated therewith wherein said aqueous solvent contains a low-foaming surfactant for facilitating removal and suspension of said residual material in a concentration of up to 5 ouches per 10 gallons of aqueous solvent and wherein said surfactant is elected from the group of oxygenated hydrocarbons comprising ethers, alcohols ketones, aldehydes, cyclic hydrocarbons, aromatic hydrocarbons which oxygenated hydrocarbons have limited solubility in the organic phase of said residual materials.

11. A process for reclaiming and preparing plastic containers for recycling said plastic which containers have associated therewith residual material such as an organic liquid phase and a solid waste phase comprising the steps of:
   a) dividing said containers into relatively large pieces of plastic that are small enough to allow aqueous solvent to reach each area of said plastic pieces,
   b) loading said cut plastic pieces into a vessel with as aqueous based solvent adapted to loosen and suspend said residual material,
   c) agitating said aqueous solvent by rotating or reciprocating a part of said vessel to loosen, suspend and remove said residual material from said plastic pieces,
   d) separating said aqueous solvent containing any residual material suspended therein from said plastic pieces,
   e) separating said aqueous solvent from any organic liquid residual material and from any solid waste residual material,
   f) regenerating said aqueous solvent and recycling said aqueous solvent in the process,
   f) recovering organic liquid residual material and solid waste residual material free of aqueous solvent, and
   g) recovering cleaned plastic pieces ready for recycling.

12. A process of claim 11 for reclaiming and preparing plastic containers for recycling said plastic which containers have associated therewith residual material such as an organic liquid phase and a solid waste phase wherein said aqueous solvent contains up to about 5 ouches per 10 gallons of aqueous solvent of at least one or more of the materials selected from the group consisting of 2-butoxyethanol, monobutyl ether, 2-amino ethanol, ethylene glycol, amyl ether, methyl ethyl ether, triethyl amine, and ethyl acetate and wherein said aqueous solvent has a pH in the range of about 8 to 12.5.

13. A process of claim 12 for reclaiming and preparing plastic containers for recycling said plastic which containers have associated therewith residual material such as an organic liquid phase and a solid waste phase wherein said aqueous solvent contains a low foaming type surfactant and wherein said aqueous solvent is heated to a temperature in the range of about 90 to 120 degrees Farenheit.

14. A process of claim 13 for reclaiming and preparing plastic containers for recycling said plastic which containers have associated therewith residual material such as an organic liquid phase and a solid waste phase wherein an organic liquid phase is separated from said aqueous solvent by applying heat to said aqueous solvent containing said liquid organic phase suspended thereby and a solid waste phase is separated from said aqueous solvent by applying heat to said aqueous solvent and allowing said solid waste phase to settle from said aqueous solvent.

15. A process of claim 14 for reclaiming and preparing plastic containers for recycling said plastic which containers have associated therewith residual material such as an organic liquid phase and a solid waste phase wherein said plastic pieces are further separated from any remaining aqueous solvent after simply draining said aqueous solvent from said plastic pieces by using centrifugal forces to remove said aqueous solvent from said cleaned plastic pieces.

16. A process of claim 15 for reclaiming and preparing plastic containers for recycling said plastic which containers have associated therewith residual material such as an organic liquid phase and a solid waste phase wherein said plastic pieces are further separated from any remaining residual material by passing said cleaned plastic pieces with any remaining residual material through a screen separator.

17. A process for cleaning residual material such as a liquid organic phase and a solid waste phase from plastic containers for recycling said plastic comprising the steps of:
   a) dividing said plastic containers into relatively large pieces that are small enough to allow as aqueous solvent to reach each area of said plastic pieces,
   b) loading said plastic pieces into a vessel with an aqueous solvent adapted to loosen and suspend said residual material,
   c) agitating said aqueous solvent containing said plastic pieces to loosen, suspend and remove said residual material from said plastic pieces,
   d) separating said aqueous solvent containing said suspended residual material from said plastic pieces by draining said aqueous solvent from said plastic pieces,
   e) separating said residual material from said aqueous solvent and recycling said aqueous solvent through said cleaning process, and
   f) recovering cleaned plastic pieces from said process suitable for recycling said plastic.

18. A process of claim 17 wherein said relatively large plastic pieces have a size in the range of about one-half to five inches.

19. A process of claim 18 wherein said aqueous solvent is alkaline and has a pH in the range of about 8 to 12.5 and wherein said aqueous solvent contains up to about 5 ouches per 10 gallons of aqueous solvent of a low foaming oxygenated surfactant and wherein suspended residual material is separated from said aqueous solvent by applying heat to said aqueous solvent.

20. A process of claim 18 wherein said aqueous solvent contains at least one low foaming surfactant in a concentration of up to 5 ounces per 10 gallons of aqueous solvent and wherein said surfactant is selected from the group comprising ethers, alcohols, ketones, aldehydes, cyclic hydrocarbons, aromatic hydrocarbons which have a limited solubility in the organic phase of said residual materials.

* * * * *